United States Patent
Du Val

(10) Patent No.: US 8,341,678 B1
(45) Date of Patent: Dec. 25, 2012

(54) USING TV REMOTE CONTROL AND TV TO DISPLAY CONTENT FROM ANY ONE OF MULTIPLE SOURCES

(75) Inventor: Jordan Du Val, Sunnyvale, CA (US)

(73) Assignee: Meld Technology Inc., Sunnyvale, CA (US)

( * ) Notice: Subject to any disclaimer, the term of this patent is extended or adjusted under 35 U.S.C. 154(b) by 570 days.

(21) Appl. No.: 12/505,337

(22) Filed: Jul. 17, 2009

Related U.S. Application Data

(60) Provisional application No. 61/135,194, filed on Jul. 18, 2008.

(51) Int. Cl.
*H04N 7/18* (2006.01)
*H04N 7/173* (2011.01)
*H04N 7/16* (2011.01)

(52) U.S. Cl. ............ 725/74; 725/93; 725/100; 725/139; 725/151

(58) Field of Classification Search .......................... None
See application file for complete search history.

(56) References Cited

U.S. PATENT DOCUMENTS

| 7,324,793 | B2 * | 1/2008 | Lee et al. ....................... 455/130 |
| 8,037,506 | B2 * | 10/2011 | Cooper et al. .................. 725/93 |
| 2002/0144289 | A1 * | 10/2002 | Taguchi et al. ............... 725/112 |
| 2006/0063490 | A1 * | 3/2006 | Bader et al. ...................... 455/45 |
| 2006/0080707 | A1 * | 4/2006 | Laksono ......................... 725/38 |

OTHER PUBLICATIONS

"Quick Install Guide Model: ACS-5820 5.8 GHz Cable Sender," manual, RF-Link/Araneus USA, Inc., pp. 1-7.
"Performance Multi-Room Video—Modulator Installation Manual," Linear LLC, pp. 1-12.

* cited by examiner

*Primary Examiner* — Bennett Ingvoldstad
(74) *Attorney, Agent, or Firm* — Patent Law Group LLP; David C. Hsia

(57) ABSTRACT

A method is provided for a system to display media contents from source devices on television channels of a television. The method includes receiving a channel change command from a remote control, where the channel change command causes the television to display a new television channel. The method further includes, in response to the channel change command, changing a frequency of a radio frequency (RF) carrier of a television RF signal to a frequency of the new television channel, determining one of the source devices assigned to the new television channel, and providing the television RF signal to the television, where the television RF signal includes a media content from the assigned source device.

17 Claims, 12 Drawing Sheets

| PERSONAL CHANNEL TABLE SCHEDULER ||||
|---|---|---|---|
| Day | From | To | Action |
| Every day | 23:00 | | TV off command |
| Every day | 5:00 | | TV on command |
| Monday | 5:00 | 9:00 | Run Client_PCT_ID_001 |
| Monday | 9:00 | 17:00 | Run Client_PCT_ID_002 |
| Monday | 17:00 | 23:00 | Run Client_PCT_ID_002 |
| Every day | 23:00 | | TV off command |
| Every day | 5:00 | | TV on command |
| Tuesday | 5:00 | 9:00 | Run Client_PCT_ID_001 |
| Tuesday | 9:00 | 17:00 | Run Client_PCT_ID_002 |
| Tuesday | 17:00 | 23:00 | Run Client_PCT_ID_002 |
| ... | | | |

FIG. 9

USING TV REMOTE CONTROL AND TV TO DISPLAY CONTENT FROM ANY ONE OF MULTIPLE SOURCES

CROSS REFERENCE TO RELATED APPLICATION

This application claims priority to U.S. Provisional Pat. App. Ser. No. 61/135,194, entitled "TV Remote Control Used in Conjunction with TV to Display Content from Any One of a Plurality of Sources," filed on Jul. 18, 2008, which is incorporated herein by reference. This application is related to U.S. patent application Ser. No. 11/740,685, entitled "Content Delivery to a Digital TV Using a Low-Power Frequency Converted RF Signal," filed on Apr. 26, 2007, which is incorporated herein by reference.

FIELD OF PRESENT DISCLOSURE

This present disclosure relates to a method of enabling a TV to receive content from any one of multiple sources including websites by using a TV channel selection paradigm and a TV remote control.

DESCRIPTION OF RELATED ART

Accessing web content from a TV has been the goal of computer and consumer electronics companies for years. FIG. 1 illustrates how this has been achieved by using a personal computer (PC) 102 connected to the Internet 104, running a web browser, and sending the resulting content 106 directly to a TV 108. A similar result can be accomplished by embedding an Internet capable computer inside a TV or using an Internet Protocol (IP) set-top box appliance instead of a PC.

Although this technique can achieve good results, it requires a PC or set-top box in close proximity and directly connected to the TV. Complexity, lack of space, or lack of a convenient user interface has limited the usage of the PC or set-top box in this way. Alternatively, embedding a computer with a web browser inside the TV will prove cumbersome, as constant evolution of PC requirements will put onerous demands on the TV's embedded computer. Hence this approach will be costly, inflexible, and not likely to produce desirable results over the expected 7-10 year expected life of the TV. Finally, many of these approaches are hampered by the PC style user interface (UI), requiring keyboard and mouse control for navigation. This usage model doesn't fit the needs of the casual TV viewer where navigation is often simply channel up or down remote control clicks.

It is becoming increasingly evident that it is desirable to leverage the PC's flexibly and power, while creating an intuitive system for viewing Internet content on a TV.

SUMMARY

Before explaining one or more embodiments of the present disclosure in detail, it is to be understood that the present disclosure is not limited in its application to the details of construction and to the arrangements of components set forth in the following description or illustrated in the drawings. The present disclosure is capable of other embodiments and of being practiced and carried out in various ways. Also, it is to be understood that the phraseology and terminology employed herein are for the purpose of the description and should not be regarded as limiting.

One or more embodiments of the present disclosure enable a TV to receive media content from any one of multiple sources by using the TV channel selection paradigm and a TV remote control.

One or more embodiments of the present disclosure provide a system wherein users can access their own personal channel assignments from any TV.

One or more embodiments of the present disclosure provide a system wherein users can customize their channel assignments to contain any number of media types.

One or more embodiments of the present disclosure provide a system which enables access to any desired website or media content by tuning to an assigned TV channel.

One or more embodiments of the present disclosure present a target web page that is easily navigable by a TV remote control.

One or more embodiments of the present disclosure provide a system that automatically controls playback of desired content assigned to a TV channel.

BRIEF DESCRIPTION OF THE DRAWINGS

In the drawings:

FIG. 9 illustrates a data structure of a personal channel table scheduler in one or more embodiments of the present disclosure.

Use of the same reference numbers in different figures indicates similar or identical elements.

DETAILED DESCRIPTION

Video Base Station

The present disclosure provides a method and a system for enabling a digital TV to receive content from any one of a group of sources by using the TV channel selection paradigm and a TV's remote control. The content may in any media type including television, radio, film, video, print, photography, and electronic such as web pages, blogs, and streams.

Figure 1:
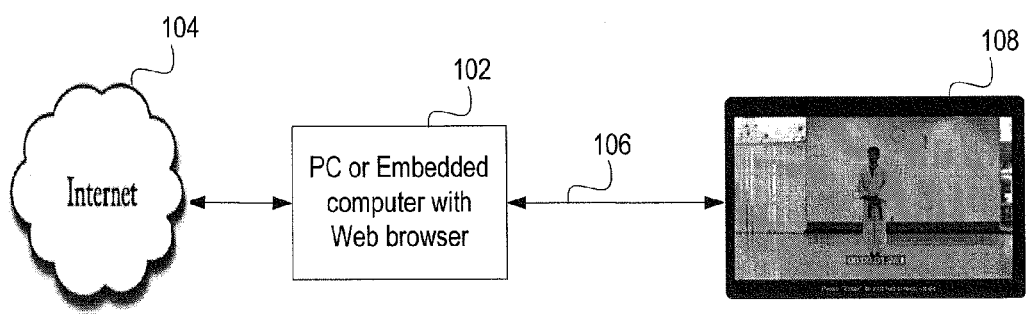
FIG. 1 illustrates a prior art system for viewing web content on a TV.
Figure 2A:
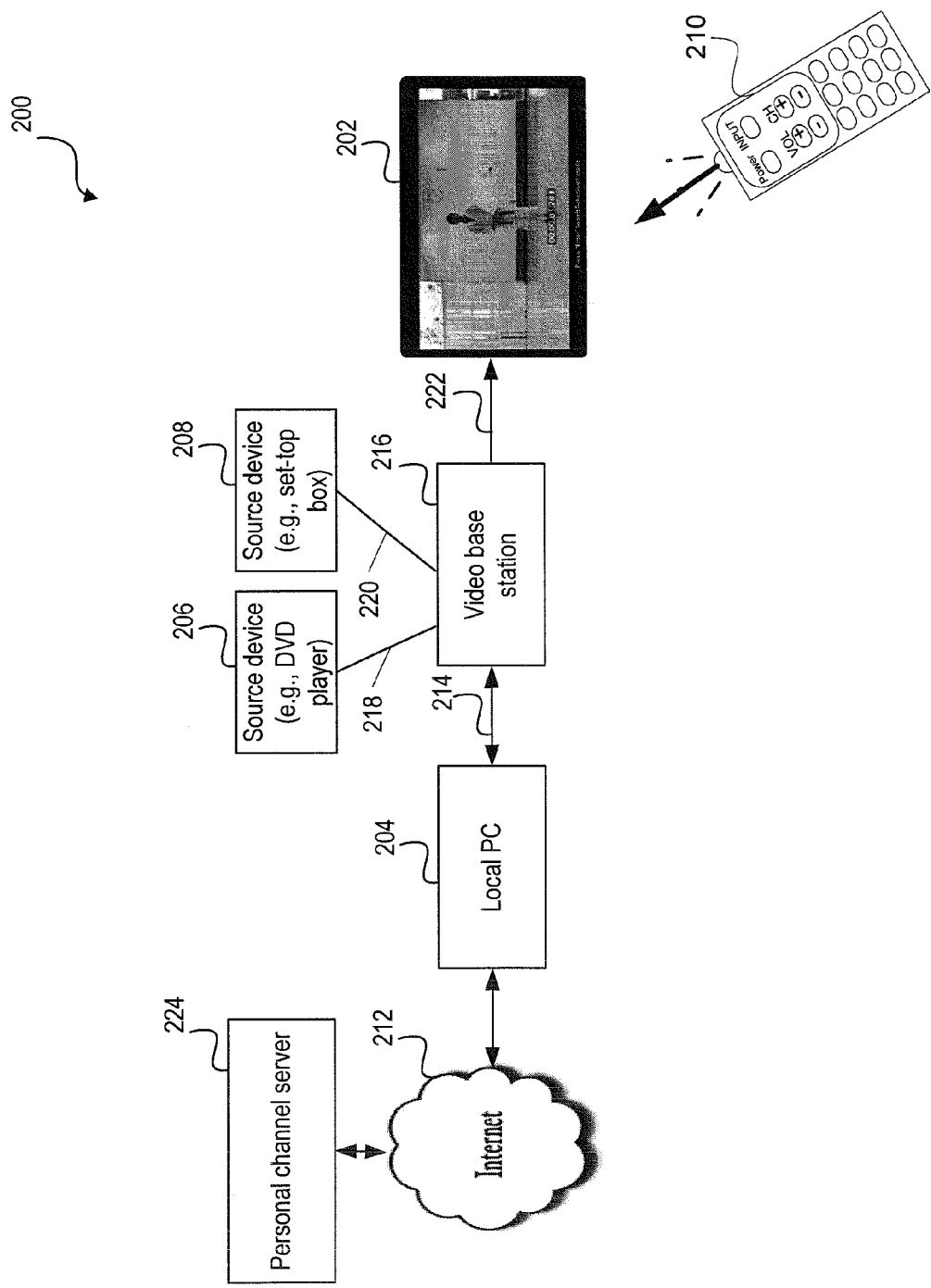
FIGS. 2A and 2B illustrate a system that enables a TV to receive media content from any one of multiple sources by tuning to assigned TV channels using a TV remote control in accordance with one or more embodiments of the present disclosure.

FIG. 2A illustrates a system 200 that enables a digital TV 202 to receive media content from any one of multiple sources 204, 206, and 208 by tuning to assigned TV channels using a remote control 210 in accordance with one or more embodiments of the present disclosure. Remote control 210 represents one or more remotes for TV 202 and sources 204, 206, and 208, or a universal remote control for controlling the TV and the sources.

Source 204 is a personal computer (PC) that is local to the user (e.g., within the residence of the user). PC 204 may run web-browsing software connected to the Internet 212 to send a media content 214 from a website to a video base station (VBS) 216. Alternatively, PC 204 may send media content 214 from a local hard drive to VBS 216. Content 214 may be the resulting screen content, which may be a DVI, DisplayPort, or RGB graphics stream from the graphics adapter card of PC 204 to VBS 216. Alternatively content 214 may be files or streams provided over a USB or a network interface card to VBS 216.

Source 206 may be a DVD player that sends a media content 218 to VBS 216. Source 208 may be a set-top box (e.g., a cable or satellite set-top box) that sends a media content 220 to VBS 216. Additional sources, such as a game console and a digital video recorder, may also be connected to VBS 216. The sources may provide their contents as line level audio/video inputs to VBS 216, such as HDMI, DVI, RGB, component video, S-video, composite video, YPbBr, RCA audio, digital fiber audio, digital coax audio inputs.

VBS 216 has multiple input ports connected to the sources. VBS 216 selects one of the sources, by selecting the corresponding input port, and converts the media content from the selected source into a video content stream 222 that is compatible with the RF input of TV 202. For example in USA, a video content stream 222 compatible with the RF input of TV 202 is defined by the ATSC as vestigial side band (VSB) modulated MPEG-2. VBS 216 may support other global broadcast video modulation schemes and it is not limited to US ATSC.

In addition or as an alternative to a video content stream 222 compatible with the RF input of TV 202, VBS 216 may convert the media content of the selected source into a video content stream that is compatible with line level audio/video inputs of TV 202, such as HDMI, DVI, RGB, component video, S-video, composite video, YPbBr, RCA audio, digital fiber audio, digital coax audio inputs.

A personal channel server computer 224 may be provided to store one or more personal channel tables that assign the television channels to the sources, and personal channel table schedulers that assign the personal channel tables to specific day and time. The personal channel tables and the personal channel table schedulers are described later in more detail.

Figure 2B:
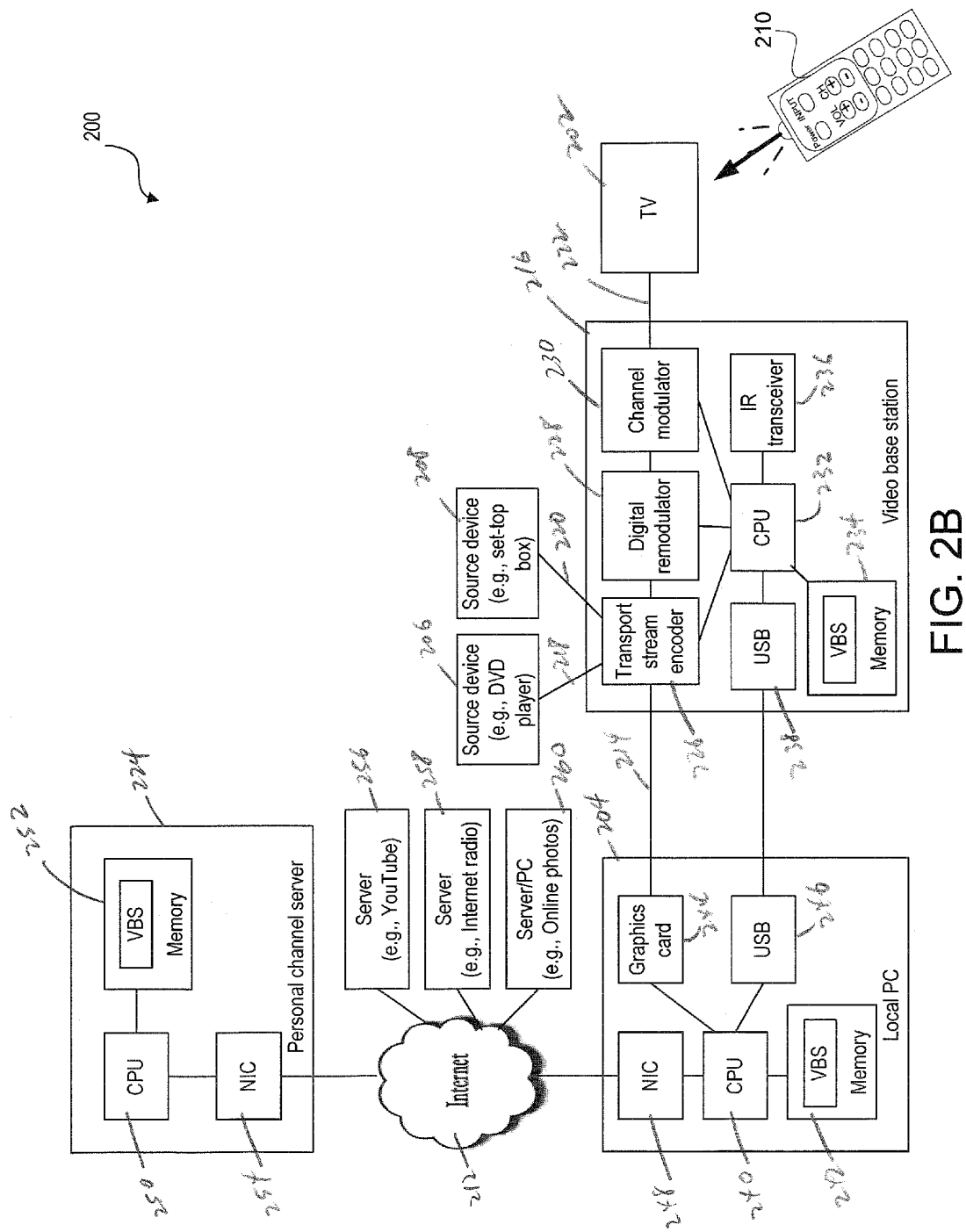

FIG. 2B illustrates the details of example components of system 200 in one or more embodiments of the present disclosure. VBS 216 includes a transport stream encoder 226, a digital modulator/remodulator 228, a channel modulator 230, a processor 232 with memory 234, a remote control transceiver 236, and a USB port 238. Transport stream encoder 226 can convert media content from any of the sources from an original format signal to a digital television (DTV) transport stream signal. Processor 232 can instruct transport stream encoder 226 to select one of the sources as the encoder input. Digital modulator 230 takes the DTV transport stream signal and creates a DTV baseband signal suitable for frequency up-conversion by channel modulator 216 and reception by TV 202. Channel modulator 230 modulates the DTV baseband signal onto an RF carrier signal to create a DTV RF signal. Processor 232 can instruct channel modulator 230 to change the carrier frequency.

Transport stream encoder 226 may include a DTV receiver. If the selected source is an antenna or a direct coax feed from the cable company that provides a DTV RF signal, the DTV receiver extracts a DTV baseband signal for a particular television channel, bypasses digital modulator 228, and provides the signal to channel modulator 216.

Processor 232 executes software in memory 234 to control the operations of VBS 216. Remote control transceiver 236 receives commands from remote control 210. Remote control transceiver 236 passes the commands to processor 232. Processor 232 may use remote control transceiver 236 to generate commands for sources 206 and 208. Sources 206 and 208 may also receive the commands from remote control 210 and process them if relevant.

PC 204 includes a processor 240 coupled to a memory 242, a graphics adapter card 244, a USB port 246, and a network interface card 248. Processor 240 executes software in memory 242 to help implement system 200. Similarly, personal channel server computer 224 includes a processor 250 coupled to a memory 252 and a network interface card 254. Processor 250 executes software in memory 252 to help implement system 200.

PC 204 may access web contents from server computers on the Internet 212. For example, server computer 256 hosts a video sharing website and server computer 258 provides an Internet radio station. PC 204 may also access media content on a remote PC 260 connected to the Internet 212.

Video Base Station+Network Interface Module Rx/Tx

Figure 3A:
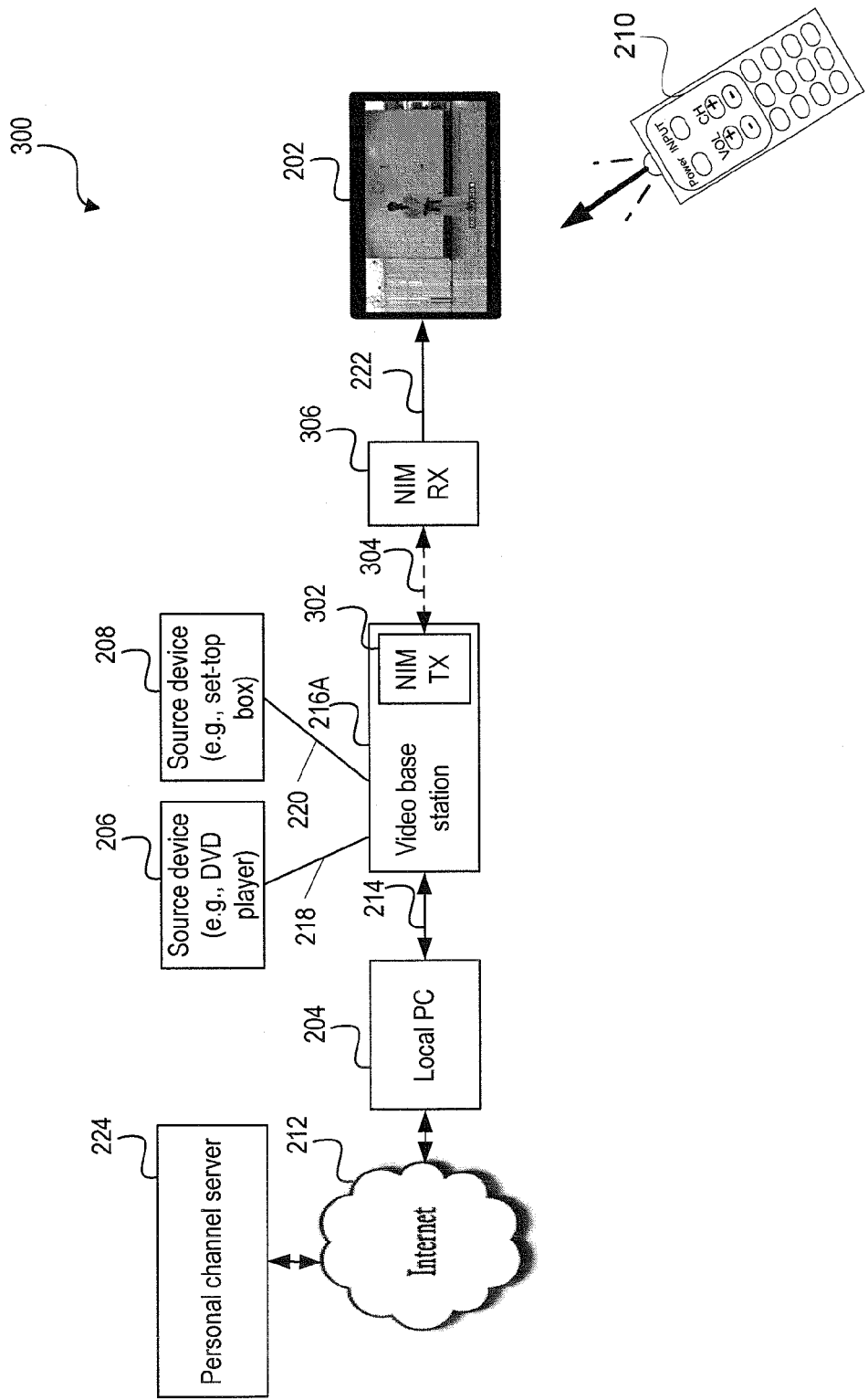
FIGS. 3A and 3B illustrate a system that enables a TV to receive media content from any one of multiple sources by tuning to assigned TV channels using a remote control and by a wireless of the media content in accordance with one or more embodiments of the present disclosure.

FIG. 3A illustrates a system 300 that enables TV 202 to receive content from any one of multiple sources 204, 206, and 208 by tuning to assigned TV channels using a remote control 210 and by using a wireless transmission of the media content in one or more embodiments of the present disclosure. In system 300, a VBS 216A replaces VBS 216 described above. VBS 216A is similar to VBS 216 except for the following. VBS 216A includes a network interface module transmitter (NIMTX) 302 instead of a channel modulator 230. VBSA 216A selects one of source 204, 206, and 208, by selecting the corresponding input port, and converts the media content of the selected source to an intermediate signal 304 and transmit the signal to a network interface module receiver (NIMRX) 306 attached to the RF input of HDTV 202. NIMRX 306 converts intermediate signal 304 to a video content stream 222 that is compatible with the RF input of TV 202. NIMRX 306 may include a content cache to avoid jitter in video content stream 222.

Intermediate signal 304 may be an analog industrial, scientific, medical (ISM) band transmission at 2.4 or 5.8 GHz. Intermediate signal 304 may use any currently available digital wireless transmission standards, such as wireless USB or 802.11a/b/g/n. NIMTX 302 and MINRX 306 use compatible signaling technology that provide sufficient bandwidth to transmit the desired content from the VBS 216 to TV 202 over a reasonable distance (e.g., at least 50 to 300 feet). Intermediate signal 304 may also be a white space band transmission. White spaces refer to allocated but unused frequencies that unlicensed devices can use if the devices can guarantee that they will not interfere with assigned broadcasts.

The intermediate signal band may contain any one of potentially numerous broadcast channels and each channel could carry any one of a plurality of TV channels as per personal channel table assignment (described later). One practical usage of the broadcast channel is that each VBSA 216 with an intermediate signal 304 can have a dedicated channel assigned to a user and that user will see only the TV channel lineup as per his or her personal channel table assignment. Another user on the same or neighboring wireless network can have another VBS 216A with another intermediate signal 304 on another dedicated broadcast channel and that enables the other user to see the full TV channel lineup as per his or her personal channel table assignment.

In one or more embodiments of the present disclosure, NIMRX 306 converts the media content of the selected source to a video content stream 222 that is compatible with line level audio/video inputs of TV 202, such as HDMI, DVI, RGB, component video, S-video, composite video, YPbBr, RCA audio, digital fiber audio, digital coax audio inputs.

Figure 3B:
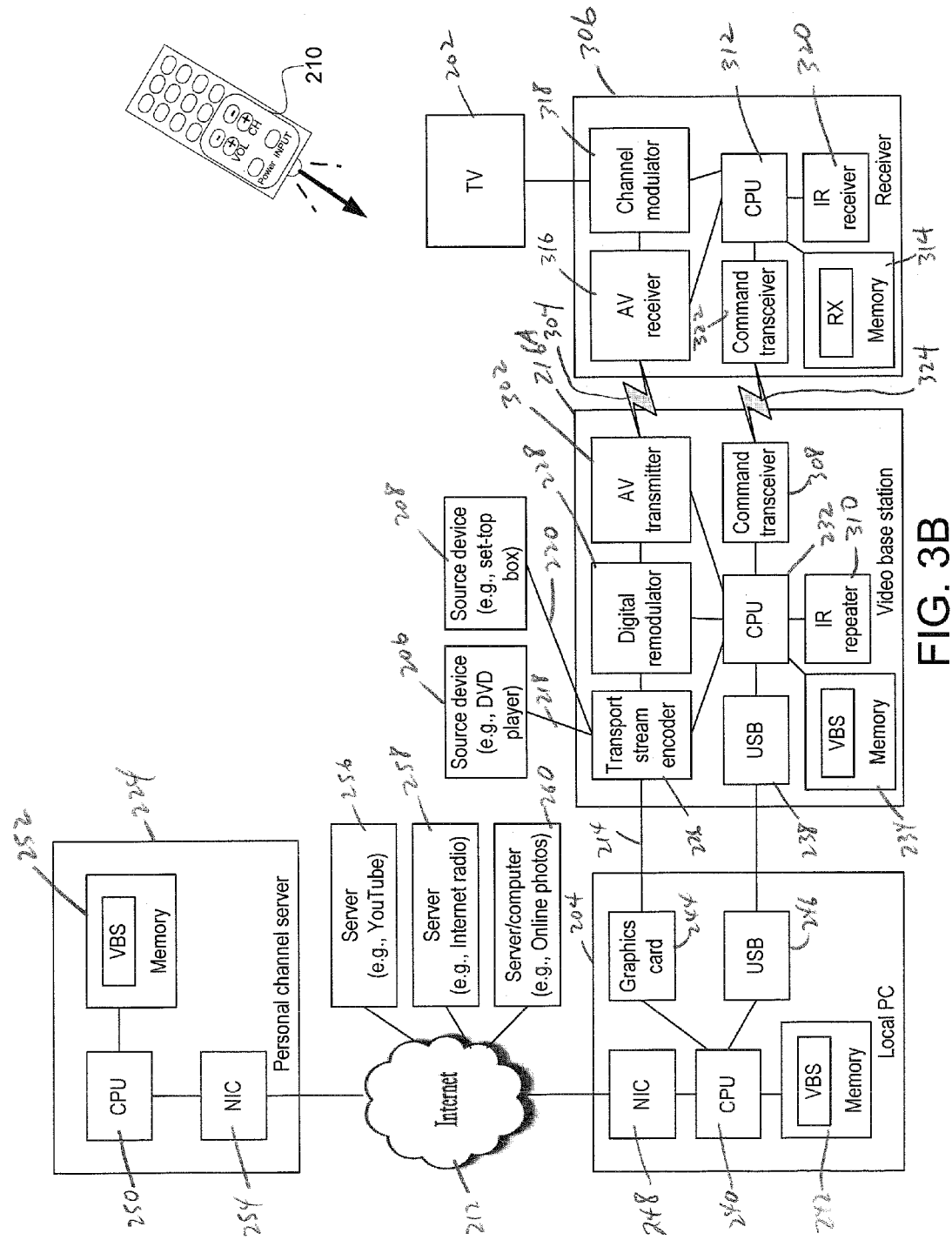

FIG. 3B illustrates the details of example components of system 300 in one or more embodiments of the present disclosure. VBS 216A includes transport stream encoder 226, digital modulator 228, an audio-visual (AV) transmitter 302, processor 232 with memory 234, a command transceiver 308, a remote control repeater 310 (e.g., an IR repeater), and a USB port 238. AV transmitter 302 modulates the DTV baseband signal from digital modulator 228 onto an intermediate carrier to create intermediate signal 304. Command transceiver 308 receives remote control commands relayed from NIMRX 306 and passes the commands to processor 232. Processor 232 may forward the commands to source 204 via USB port 238, and sources 206 and 208 via remote control repeater 310.

NIMRX 306 includes a processor 312 coupled to a memory 314, an AV receiver 316, a channel modulator 318, a remote control receiver 320 (e.g., an IR receiver), and a command transceiver 322. AV receiver 316 receives intermediate signal 304 and converts the signal to the DTV baseband signal. Channel modulator 318 modulates the DTV baseband signal onto an RF carrier to create a DTV RF signal. Processor 312 can instruct channel modulator 318 to change the carrier frequency.

Processor 312 executes software in memory 314 to control the operations of NIMRX 306. Remote control receiver 320 receives commands from remote control 210. Remote control receiver 320 passes the commands to processor 312. Processor 312 may forward the commands to VBS 216A via command transceiver 322.

Personal Channel Table

Figures 4A, 4B:
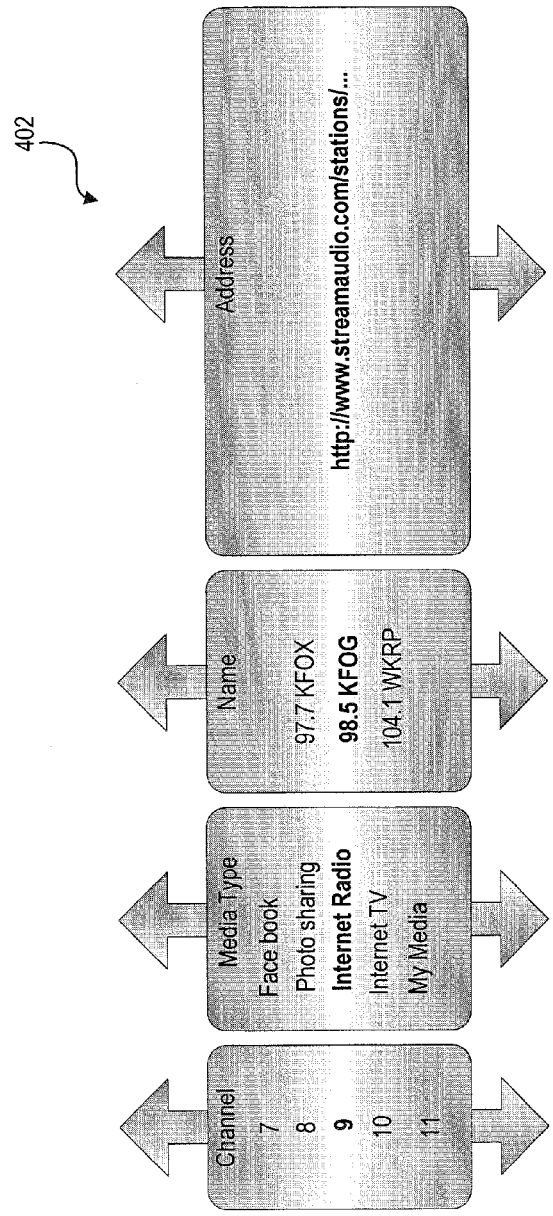
FIG. 4A illustrates a data structure of a personal channel table in one or more embodiment of the present disclosure.
FIG. 4B illustrates a user interface for setting the personal channel table of FIG. 4A in one or more embodiments of the present disclosure.

FIG. 4A illustrates a data structure of a personal channel table (PCT) 400 in one or more embodiments of the present disclosure. PCT 400 can associate each television channel to a source device or a web content. PCT 400 is a table that stores television channel number, media type, descriptive name, and instruction. The instruction identifies the VBS input port for a source device. The instruction may include a command to be performed to the source device. Although not shown, the table may also store a location of the source device.

As can be seen, television channel 8 is assigned to a media type of "Cable," a descriptive name of "ESPN," and an instruction of "Video 1, Channel 724." The media type indicates to VBS 216/216A that the source device is a cable set-top box (e.g., source 208). The instruction causes VBS 216/216A to select its Video 1 input port to process the content of the cable set-top box, and to change the source channel of the cable set-top box to channel 724. VBS 216 uses remote control transceiver 236 to change the cable set-top box to source channel 724. Similarly, VBS 216A uses remote control repeater 310 to change the cable set-top box to source channel 724. If the source channel is left empty, then the user may use remote control 210 to change the source channel on the cable set-top box.

Television channel 7 is assigned to a media type of "DVD player," a descriptive name of "DVD," and an instruction of "Video 2, Auto play." The media type indicates to VBS 216/216A that the source device is a DVD player (e.g., source 206). The instruction causes VBS 216/216A to select its Video 2 input port to process the content of the DVD player, and to automatically start playback of the disc in the DVD player. VBS 216 uses remote control transceiver 236 to start playback on the DVD player. Similarly, VBS 216A uses remote control repeater 310 to start playback on the DVD player.

Television channel 6 is assigned to a media type of "Broadcast TV," a descriptive name of "ABC-Live," and an instruction of "RF, Channel 7." The media type indicates to VBS 216/216A that the source device is an antenna for receiving terrestrial broadcasts. The instruction causes VBS 216/216A to select its RF input port to process the content received over the air, and to tune to source channel 7. If the source channel is left empty, then the user may use remote control 210 to tune to the source channel using the DTV receiver in VBS 216/216A.

Television channel 5 is assigned to a media type of "Internet TV," a descriptive name of "YouTube currently watched," and an instruction with the URL of web content. The media type indicates to VBS 216/216A that the source is a server computer with web content (e.g., server computer 256). The instruction causes VBS 216/216A to select its input port connected to PC 204 to process the web content. VBS 216/261A also provides the URL to PC 204 when the PC does not have a copy of PCT 400, or simply the television channel number when the PC does have a copy of the PCT. PC 204 then accesses the web content and optionally starts playback of the web content (e.g., one or more videos).

Television channel 4 is assigned to a media type of "Internet Radio," a descriptive name of "98.5 KFOG," and an instruction with the URL of web content. The media type indicates to VBS 216/216A that the source is a server computer with web content (e.g., server computer 258). The instruction causes VBS 216/216A to select its input port connected to PC 204 to process the web content. VBS 216/261A also provides the URL to PC 204 when the PC does not have a copy of PCT 400, or simply the television channel number when the PC does have a copy of the PCT. PC 204 then accesses the web content and optionally starts playback of the web content (e.g., a radio stream).

Television channel 3 is assigned to a media type of "My media," a descriptive name of "Grandparents photo," and an instruction with the URL to the remote content. The media type indicates to VBS 216/216A that the source is a computer with media content (e.g., remote computer 260). The instruction causes VBS 216/216A to select its input port connected to PC 204 to process the media content. VBS 216/261A also provides the URL to PC 204 when the PC does not have a copy of PCT 400, or simply the television channel number when the PC does have a copy of the PCT. PC 204 then accesses the media content and optionally starts playback of the media content (e.g., a slideshow of photos).

Television channel 2 is assigned to a media type of "My media," a descriptive name of "My holiday photos," and an instruction with a path to the local content. The media type indicates to VBS 216/216A that the source a computer with media content (e.g., server computer 256). The instruction causes VBS 216/216A to select its input port connected to PC 204 to process the media content. VBS 216/261A also provides the URL to PC 204 when the PC does not have a copy of PCT 400, or simply the television channel number when the PC does have a copy of the PCT. PC 204 then accesses the media content and optionally starts playback of the media content (e.g., a slideshow of photos).

A first time user may use PC 204 to access a website hosted by a personal channel server computer 224 to create her own PCT. The user may create her own PCT based on a generic default PCT. The PCT may be downloaded and stored at PC 204 and VBS 216/216A, and periodically synchronized with the PCT on personal channel server computer 224. Alternatively, the user creates and stores her PCT locally on PC 204 or VBS 216/216A, and store copies in the PC and the VBS.

FIG. 4B illustrates a user interface 402 for setting a PCT in one or more embodiments of the present disclosure. User interface 402 may resemble a series of selection dials. The user would select any logical combination of assignments on the dials. User interface 402 would prevent users from making a channel assignment that would be either inappropriate or un-allowed. User interface 402 would limit the possible options relative to the previous dial setting(s). For example, if the user selects for media type "Internet Radio," then only names and addresses for allowed Internet radio websites would be shown in the following dials. For advanced users, it may be possible to input any combination of channel, name, and web address.

Figure 4C:
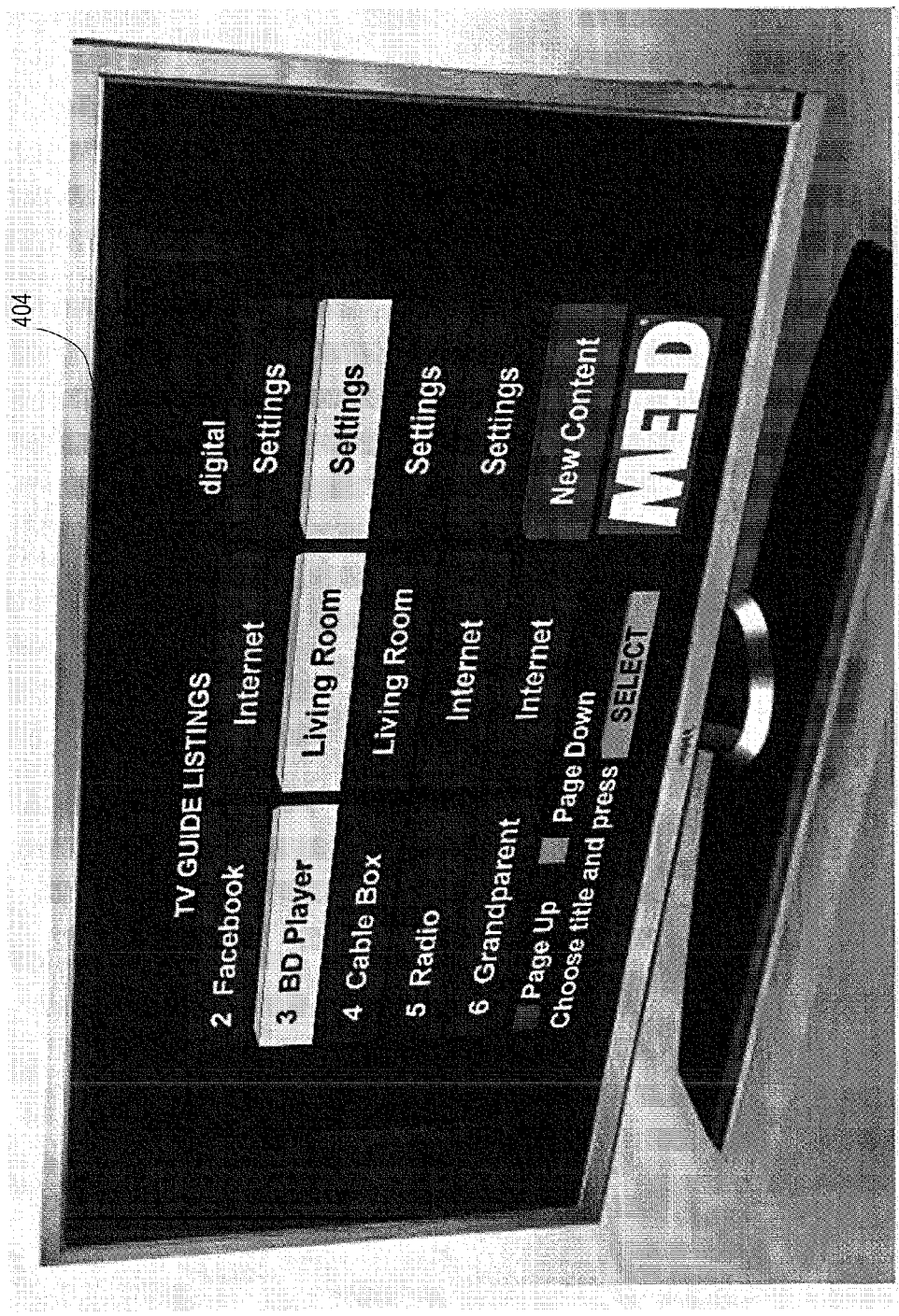
FIG. 4C illustrates an onscreen TV guide that allows the user to navigate through a personal channel table in one or more embodiments of the present disclosure.

FIG. 4C illustrates an onscreen TV guide 404 that allows the user to navigate through a PCT in one or more embodiments of the present disclosure. Guide 404 is generated by VBS 216/216A and displayed on TV 202. Guide 404 lists the TV channel number and a description of the source device in the first column, the location of the source device in the second column, and a "Settings" button in the third column. Selecting the Settings button allows the user to enter into a menu to restrict access a source device assigned to the TV channel. PC 204 may detect new content on a server or computer source device and inform VBS 216/216A, which may replace the Settings button with a "New Content" message for the corresponding TV channel.

Setup of the Personal Channel Server

Figure 5:
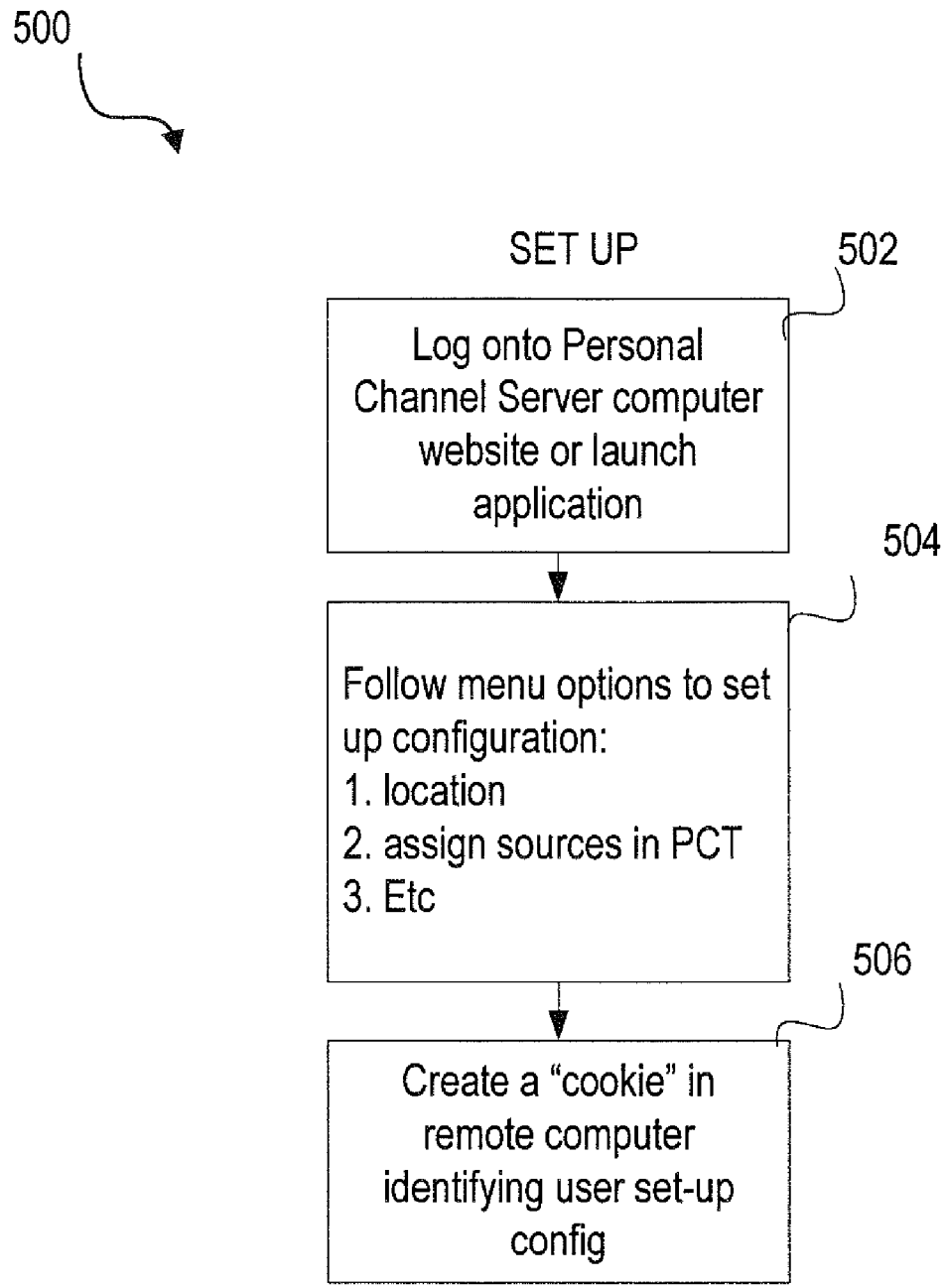
FIG. 5 is a flowchart of the setup procedure that may be used upon initialization of the system in one or more embodiments of the present disclosure.

FIG. 5 is a flowchart of a method 500 to set up procedure for the transfer of information between PC 204 and the personal channel server (PCS) computer 224.

In block 502, the user logs onto PCS computer 224 either using conventional techniques, such as by typing in the address or clicking on an icon, or using a custom application installed in the PC 204. PC 204 may launch the application within a browser to communicate with the PCS computer 224 over the Internet 212.

In block 504, PCS computer 224 guides the user through the setup process using various menus. In one embodiment, the user is required to enter the geographical location of the user's home since geographic location servers to identify possible local content sources of interest. The user may also create a customized PCT 400 using user interface 402 as described earlier in reference to FIGS. 4A and 4B. PC 204 may store a copy of PCT 400 locally, provide a copy of the PCT to VBS 216/216A, or both.

In block 506, PCS computer 224 transmits to PC 204 a cookie for storing a user ID code (or any suitable information) that can be used by PCS computer 224 to identify the setup configuration of the user so the user need not perform the complete setup each time the user logs onto PCS computer 224. A cookie is a small file automatically downloaded onto a computer, which is automatically accessed at a later time by a remote computer.

One Operation Method of Sytem after Setup

Figure 6:
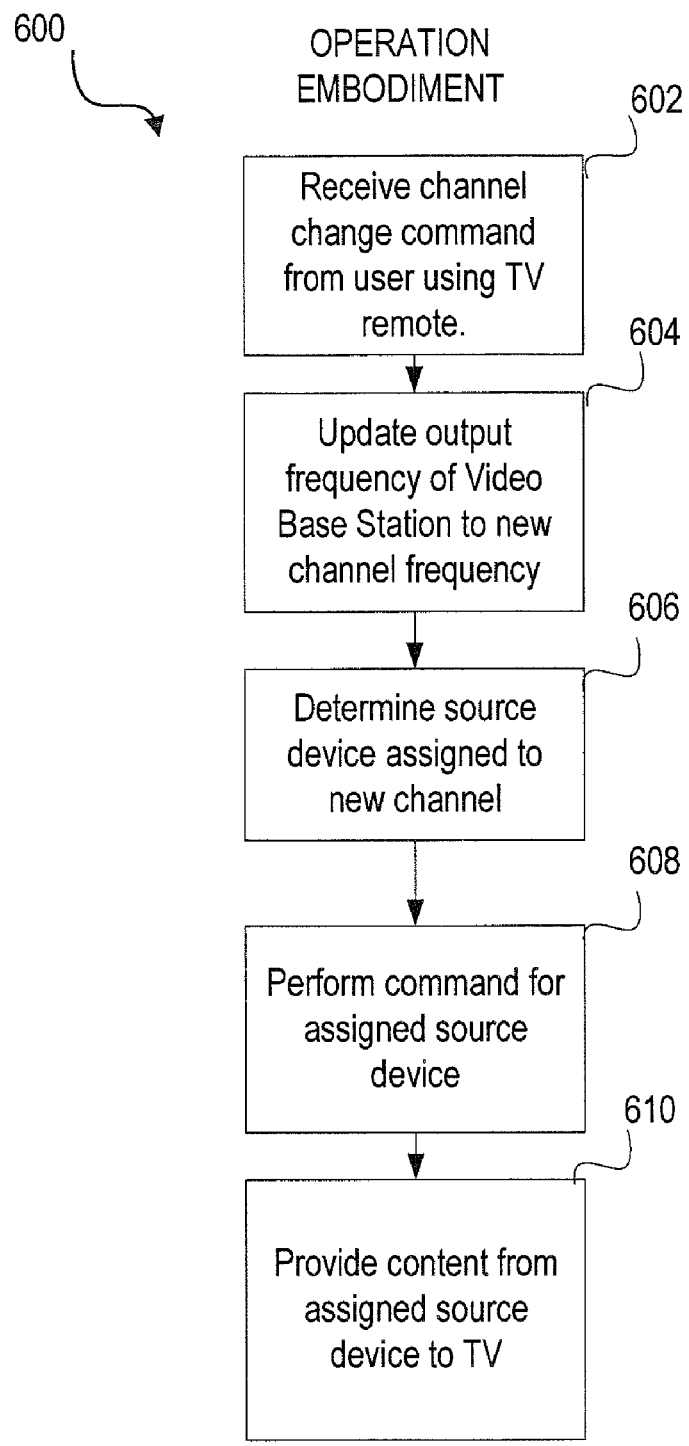
FIG. 6 is a flowchart of the operation of the system of FIGS. 2A and 2B in one or more embodiments of the present disclosure.

FIG. 6 illustrates a flowchart of a method 600 performed by system 200 after setup in one or more embodiments of the present disclosure. Prior to the start of method 600, the current channel of TV 202 and the output channel of VBS 216 may be synchronized to the same channel.

In block 602, the user issues a channel change command using remote control 210, and both TV 202 and VBS 216 receive the command.

In block 604, in response to the channel change command, TV 202 displays a new TV channel and VBS 216 changes its output channel frequency to the frequency of the new TV channel.

In block 606, VBS 216 selects the source device assigned to the new TV channel as its input. To do so, VBS 216 reads the instruction for the new TV channel from PCT 400, which identifies the VBS input port of the assigned source device.

In block 608, VBS 216 may perform a command for the assigned source device specified in the instruction for the new TV channel from PCT 400. For example, VBS 216 may command a cable set-top box to change a source channel, a DVD player to start playback, or a local PC to start playback. When the source device is web content, VBS 216 may provide the new TV channel number or the instruction for the channel to local PC 204. Local PC 204 then accesses the web content from a remote server or a remote PC over the Internet 212. In response to the instruction for the new TV channel, local PC 204 may command the remote server or remote PC to start playback. Local PC 204 may also access the web content indirectly through PSC computer 224, which may reformat the web content with additional web content or advertisement as described later.

In block 610, VBS 216 converts a media content from the assigned source device to a DTV RF signal and provides the signal to TV 202.

Another Operation Method of Sytem after Setup

Figure 7:
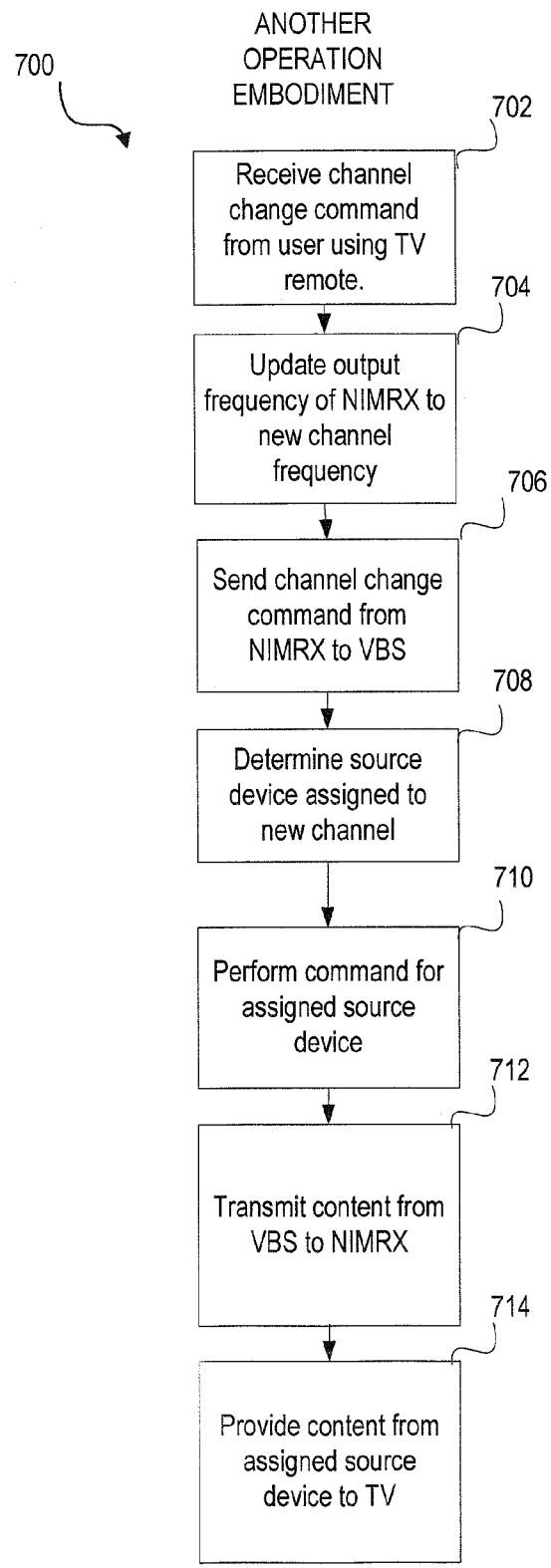
FIG. 7 is a flowchart of the operation of the system of FIGS. 3A and 3B in one or more embodiments of the present disclosure.

FIG. 7 illustrates a flowchart of a method 700 performed by system 300 after setup in one or more embodiments of the present disclosure. Prior to the start of method 700, the current channel of TV 202 and the output channel of NIMRX 306 may be synchronized to the same channel.

In block 702, the user issues a channel change command using remote control 210, and both TV 202 and NIMRX 306 receive the command.

In block 704, in response to the channel change command, TV 202 displays a new TV channel and NIMRX 306 changes its output channel frequency to the frequency of the new TV channel.

In block 706, NIMRX 306 sends the channel change command to VBS 216A.

In block 708, VBS 216A selects the source device assigned to the new TV channel as its input. To do so, VBS 216A reads the instruction for the new TV channel from PCT 400, which identifies the VBS input port of the assigned source device.

In block 710, VBS 216A may perform a command for the assigned source device specified in the instruction for the new TV channel from PCT 400. For example, VBSA 216 may command a cable set-top box to change a source channel, a DVD player to start playback, or a local PC to start playback. When the source device is web content, VBSA 216 may provide the new TV channel number or the instruction for the channel to local PC 204. Local PC 204 then accesses the web content from a remote server or a remote PC over the Internet 212. In response to the instruction for the new TV channel, local PC 204 may command the remote server or remote PC to start playback. Local PC 204 may also access the web content indirectly through PSC computer 224, which may reformat the web content with additional web content or advertisement as described later.

In block 712, VBS 216 converts a media content from the assigned source device to an intermediate signal, and transmits the signal to NIMRX 306.

In block 714, NIMRX 306 converts the intermediate signal to a DTV RF signal for TV 202.

Redirected Screen

Computer files and websites are typically static in nature and often require some user intervention in order to present dynamically updating content, as one would expect from a broadcast TV channel. In one embodiment of the present disclosure in order to make the target content more appear more "TV like," there may be software in PC 204 or PCS computer 224 that performs the appropriate actions to make the desired content appear automatically in a more broadcast like fashion. For example, when accessing a directory containing pictures, an application in PC 204 may automatically launch a viewer to show the pictures in slideshow fashion.

Figure 8A:
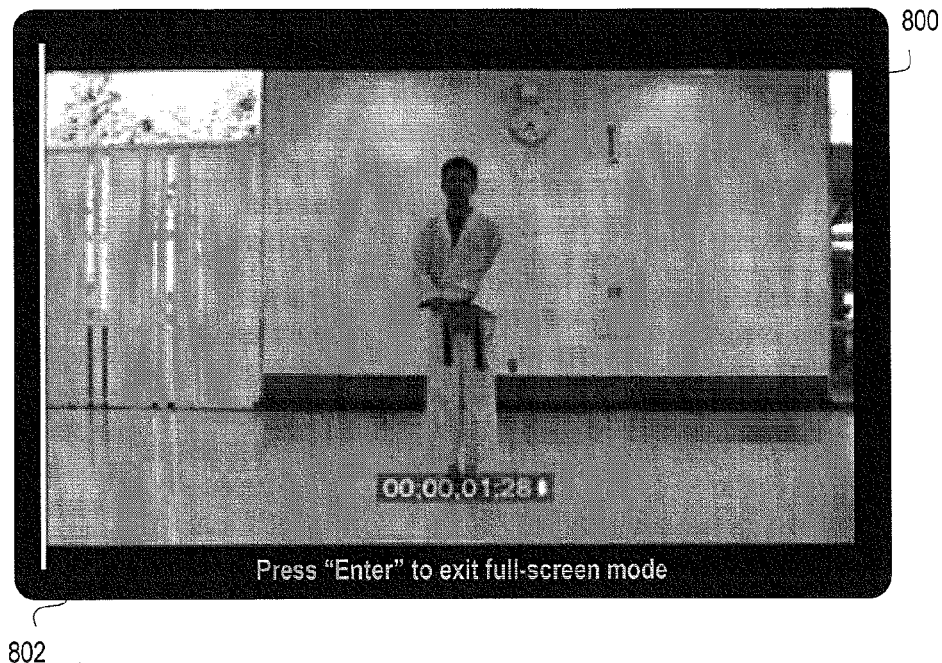
FIG. 8A illustrates a display of a web content on a television in one or more embodiments of the present disclosure.
Figure 8B:
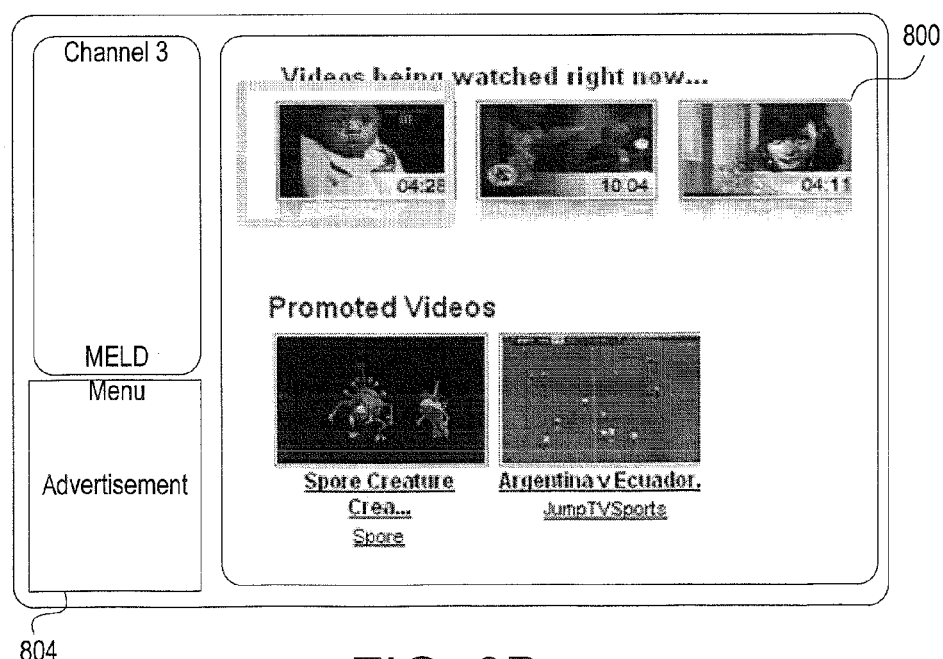
FIG. 8B illustrates a display of a web content with additional contents in one or more embodiments of the present disclosure.

FIG. 8A illustrates one embodiment of the resulting composite webpage a user could be redirected to by the system. In FIG. 8A, the presentation of YouTube target content 800 automatically begins streaming as a full screen image as opposed to waiting for specific button clicks. Also, while the user's PCT 400 may associate channel 5 with "YouTube Currently watched," the user may actually be redirected to a web page 802 provided by PCS computer 224, which shows all or a portion of the target webpage 800 as an embedded object. FIG. 8B illustrates another embodiment where PCS computer 224 presents the target content 800 or portion thereof as a web object inside another web page 804. Web page 804 may provide TV Guide like multiple navigation, additional web content, and advertisement to the user. By using up/down/enter buttons on remote control 210, the user may scroll through the web contents in a predetermined order for web page 804 and select playback of any web content.

Personal Channel Table Scheduler

For digital signage applications it may be desirable to remotely control TV functions such as on and off and schedule the showing PCT content at predetermined times. FIG. 9 illustrates one embodiment where a PCT scheduler 900 in VBS 216/216A is used to set up day, time, and actions for any number TVs in the network. For example, Safeway, Santa Clara could use a set of PCTs for showing contents on TVs located throughout the store. The TVs would be tuned to predetermined channels assigned to each zone served and each channel of the PCT would show appropriate content, i.e. health and beauty on channel 4, meat department related information on channel 6, and etc.

Various other adaptations and combinations of features of the embodiments disclosed are within the scope of the present disclosure. For example, NIMRX may be embedded or its function incorporated into TV 202. Although an IR remote control has been described, the remote control may also be a RF remote control or a wired remote control using a digital interface. Numerous embodiments are encompassed by the following claims.

What is claimed is:

1. A method for a video base station to display media contents from a plurality of sources on television channels of a television, the method comprising:

the video base station receiving a channel change command from a remote control, the channel change command causing the television to tune to a new television channel;

the video base station in response to the channel change command:
changing a frequency of a radio frequency (RF) carrier of a television RF signal to a frequency of the new television channel;
determining one of the sources assigned to the new television channel; and
providing the television RF signal to the television, the television RF signal comprising a media content from only the assigned source.

2. The method of claim 1, further comprising:
converting the media content from an original format signal to a transport stream signal; and
converting the transport stream signal to a television baseband signal.

3. The method of claim 2, wherein the television baseband signal conforms to one of NTSC, ATSC, QAM, DVB-C/T, ISDB-T, VSB, and PAL.

4. The method of claim 2, wherein providing the television RF signal to the television comprises:
modulating the television baseband signal on the RF carrier to produce the television RF signal so the television can demodulate the television RF signal and display the media content on the new television channel.

5. The method of claim 1, wherein determining one of the sources assigned to the new television channel comprises:
reading a personal channel table to determine the assigned source.

6. The method of claim 5, when the assigned source is a local personal computer, the method further comprising, in response to channel change command:
causing the local personal computer to access the media content from a remote server computer or a remote personal computer over a computer network.

7. The method of claim 6, the method further comprising, in response to the channel change command:
causing the local personal computer to trigger a playback of the media content on the remote personal computer or the remote personal computer.

8. The method of claim 5, when the assigned source is a local personal computer, the method further comprising, in response to the channel change command:
causing the local personal computer to request the media content from an intermediate server computer, which accesses the media content from a web server computer.

9. The method of claim 8, the method further comprising, in response to the channel change command:
causing the intermediate server computer to trigger a playback of the media content on the web server computer.

10. The method of claim 8, wherein the intermediate server computer reformats the media content by including one or more of an additional media content and an advertisement.

11. The method of claim 5, wherein the personal channel table is stored in the system or downloaded from a remote server computer over a computer network.

12. The method of claim 5, determining one of the sources assigned to the new television channel further comprises:
reading a personal channel table scheduler to determine the personal channel table assigned to a current day and time.

13. The method of claim 12, wherein the personal channel table scheduler is stored in the system or downloaded from a remote server computer over a computer network.

14. The method of claim 1, wherein the sources are one or more of a DVD player, a set-top box, a local personal computer, and a game console.

15. The method of claim 1, further comprising:
   receiving a command for the assigned source form the remote control or an other remote control; and
   providing the command to the assigned source.

16. The method of claim 1, further comprising:
   converting the media content from an original format signal to line level audio/video signals or an HDMI signal; and
   providing the line level audio/video signals or the HDMI signal as line level outputs or an HDMI output from the video base station.

17. A video base station for displaying media contents from sources on television channels of a television, comprising:
   a transport stream encoder;
   a digital modulator;
   a channel modulator;
   a memory encoded with processor-executable instructions, comprising:
   receiving a channel change command from a remote control, the channel change command causing the television to tune to a new television channel;
   in response to the channel change command:
      causing the channel modulator to change a frequency of a radio frequency (RF) carrier to a frequency of the new television channel;
      determining one of the sources assigned to the new television channel;
      causing the transport stream encoder to convert a media content from only the assigned source from an original format signal to a transport stream signal, wherein the digital modulator converts the transport stream signal into a television baseband signal and the channel modulator converts the television baseband signal to the television RF signal, the television RF signal comprising the television baseband signal modulated on the RF carrier that the television can demodulate and display on the new television channel; and
   a processor for executing the processor-executable instructions.

* * * * *